US007195380B2

(12) United States Patent
Suzuki et al.

(10) Patent No.: US 7,195,380 B2
(45) Date of Patent: Mar. 27, 2007

(54) INTERIOR ILLUMINATION LAMP (75) Inventors: Hiroyuki Suzuki, Haibara-gun (JP);
Kimihiro Ishii, Haibara-gun (JP);
Motoya Kimura, Nishikamo-gun (JP);
Hiroshi Ando, Kariya (JP)

(73) Assignee: Yazaki Corporation, Tokyo (JP)

( * ) Notice: Subject to any disclaimer, the term of this patent is extended or adjusted under 35 U.S.C. 154(b) by 35 days.

(21) Appl. No.: 10/969,330

(22) Filed: Oct. 21, 2004

(65) Prior Publication Data
US 2005/0180155 A1 Aug. 18, 2005

(30) Foreign Application Priority Data
Oct. 22, 2003 (JP) .......................... P2003-361796

(51) Int. Cl.
B60Q 1/00 (2006.01)
B60Q 1/26 (2006.01)
(52) U.S. Cl. ...................................... 362/488; 362/490
(58) Field of Classification Search ................. 362/488
See application file for complete search history.

(56) References Cited
U.S. PATENT DOCUMENTS 4,646,210 A * 2/1987 Skogler et al. ............. 362/494
5,113,321 A * 5/1992 Suzuki ....................... 362/518
2004/0218397 A1* 11/2004 Luo ........................... 362/500

FOREIGN PATENT DOCUMENTS

JP        58126231 A    *  7/1983    ................. 362/488
JP       2000-1141 A       1/2000

* cited by examiner

Primary Examiner—Ali Alavi
Assistant Examiner—William J Carter
(74) Attorney, Agent, or Firm—Sughrue Mion, PLLC (57) ABSTRACT An interior illumination lamp includes a body 30 for being fixed to a vehicle body 11, and a lamp 50 which is angularly movably supported on a support portion 33 mounted on the body 30, and has a lens 54 capable of transmitting a beam from a light source 37 therethrough. The lamp 50 includes a first bezel 52 angularly movably supported on the support portion 33, and a second bezel 53 which holds the lens 54, and is mounted on the first bezel 52. The second bezel 53 has a reflecting surface 55 for receiving and reflecting transmitted light through the lens 54, and this reflecting surface is designed to have a low reflectance. By doing so, the light, reflected by the reflecting surface 55, is not glaring, and therefore a beam, coming into the driver's sight via a room mirror, is not glaring, and therefore will not affect the driving operation.

3 Claims, 8 Drawing Sheets

INTERIOR ILLUMINATION LAMP

BACKGROUND OF THE INVENTION

1. Field of the Invention

This invention relates to an interior illumination lamp mounted, for example, on a door, a ceiling or others of an automobile.

2. Related Art

Figure 8:
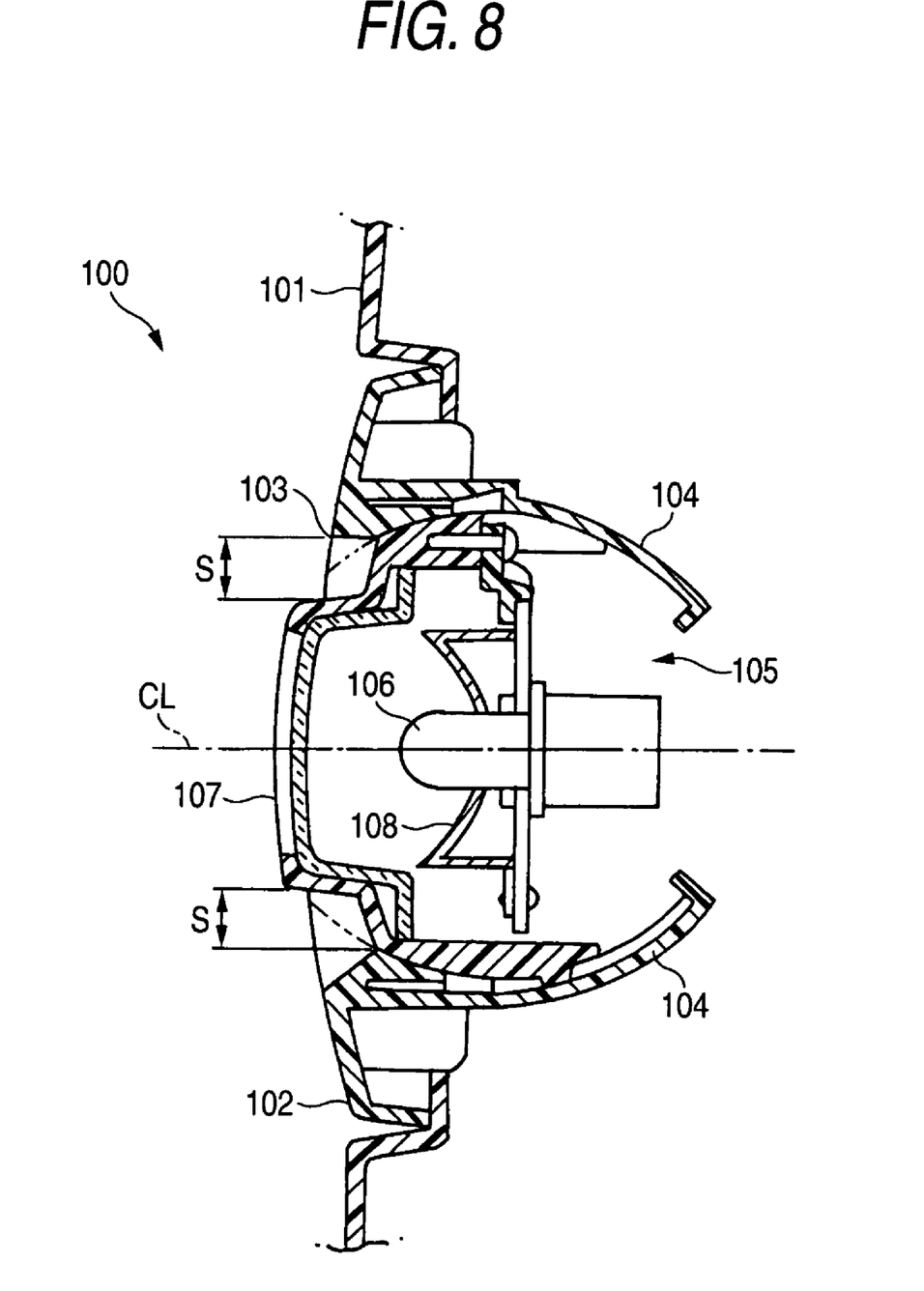
FIG. 8 is a cross-sectional view showing one conventional interior illumination lamp.

There has been disclosed one example of conventional interior illumination lamps as shown in FIG. 8 (see, for example, Unexamined Japanese Patent Publication 2000-1141).

This interior illumination lamp is mounted, for example, on a back door of a station wagon, and is used in this condition, and by changing a direction of illumination, the lamp can illuminate a luggage room (provided at a rear portion of the station wagon) and a zone beneath the opened back door.

As shown in FIG. 8, this interior illumination lamp 100 includes a lamp housing 102 mounted on a trim 101 forming a wall surface of the back door, and a round opening 103 is formed in a front side of this lamp housing 102. A lamp support portion 104, having a generally-spherical inner surface, is provided rearwardly of (at the right side in FIG. 8) the opening 103, and a lamp body 105 of a partially spherical shape is provided inside the lamp support portion 104 so as to rotate through an angle of 360 degrees in a predetermined range. A bulb 106 is mounted within the lamp body 105, and a reflecting plate 108 for reflecting light (emitted rearwardly from the bulb 106) forwardly is provided at the rear side (the right side in FIG. 8) of the bulb 106. A lens portion 107 is provided at a front side (the left side in FIG. 8) of the lamp body, and projects from the opening 103 in the lamp housing 102. A space S is formed between the lens portion 107 and an edge of the opening 103, and the amount of rotation of the lamp body 105 is limited.

Figure 9:
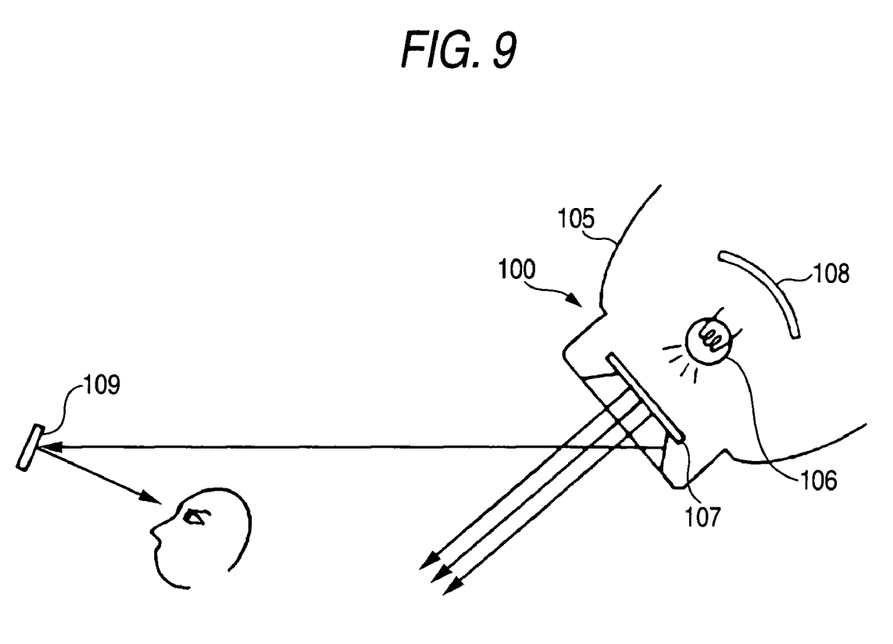
FIG. 9 is a view explanatory of a problem with the conventional construction.

Generally, the interior illumination lamp 100 for a rear seat is mostly mounted just above the rear seat. Therefore, when the passenger, sitting on the rear seat, rotates or turns the lamp body 105 forwardly in order to use the interior illumination lamp 100, the bulb 106, the reflecting plate 108, the lens portion 107, etc., are directed forwardly, and therefore in some cases, part of the lens portion 7 or the vicinity of the lens portion 107 shines. There is encountered a problem that this light comes into the driver's sight via a room mirror 109, and affects the driving operation.

SUMMARY OF THE INVENTION

This invention has been made in view of the above problem, and an object of the invention is to provide an interior illumination lamp in which when this lamp is used at a rear seat, light is prevented from coming into the driver's sight via a room mirror so that the driving operation will not be affected.

The above object has been achieved by an interior illumination lamp of the invention provided in that the lamp comprises a body for being fixed to a vehicle body, and a lamp which is angularly movably supported on a support portion mounted on the body, and includes a lens capable of transmitting a beam from a light source therethrough; and the lamp includes a first bezel angularly movably supported on the support portion, and a second bezel which holds the lens, and is mounted on the first bezel; and the second bezel has a reflecting surface for receiving and reflecting transmitted light through the lens, and the reflecting surface is designed to have a low reflectance.

In the interior illumination lamp of this construction, the reflecting surface of the second bezel for reflecting transmitted light through the lens when this transmitted light is incident on this reflecting surface is designed to have a low reflectance, and by doing so, the light, reflected by the reflecting surface, is not glaring. Therefore, abeam, coming into the driver's sight, for example, via a room mirror, is not glaring, and therefore will not affect the driving operation. Here, the low-reflectance design can be provided by forming the second bezel using a material of a low reflectance or by coating a material of a low reflectance on the relevant surface of the second bezel forming the reflecting surface. Here, the low-reflectance design means that the reflecting surface is lower in reflectance, for example, than the surface of the first bezel. Therefore, a surface treatment for intentionally lowering the smoothness of the reflecting surface, such for example as a shot blast treatment, can be effected.

The invention is also provide in that the second bezel includes a second bezel body holding the lens, and a lid portion attached to the second bezel portion, with the lens held therebetween, and the first bezel is fixed to the second bezel, thereby retaining the lens in a double manner.

In the interior illumination lamp of this construction, the second bezel, holding the lens, is fixed to the first bezel, thereby retaining the lens in a double manner, and therefore the lens is positively retained.

The invention is further provided in that the lid portion has a light-intercepting portion for intercepting part of a beam which is emitted from the light source to be incident on the lens.

In the interior illumination lamp of this construction, the light-intercepting portion, provided at the lid portion, intercepts part of a beam from the light source, and therefore the beam, passing through the lens, is prevented from being irradiated to an unnecessary range. Therefore, the beam is prevented from being irradiated to the driver, for example, via the room mirror, and will not affect the driving operation.

In the present invention, there is solved the problem that glaring light from the interior illumination lamp comes into the driver's sight via the room mirror as in the conventional construction, and therefore there is achieved an advantage that the driving operation will not be affected.

DETAILED DESCRIPTION OF THE PREFERRED EMBODIMENTS

A preferred embodiment of the present invention will now be described in detail with reference to the drawings.

Figure 1:
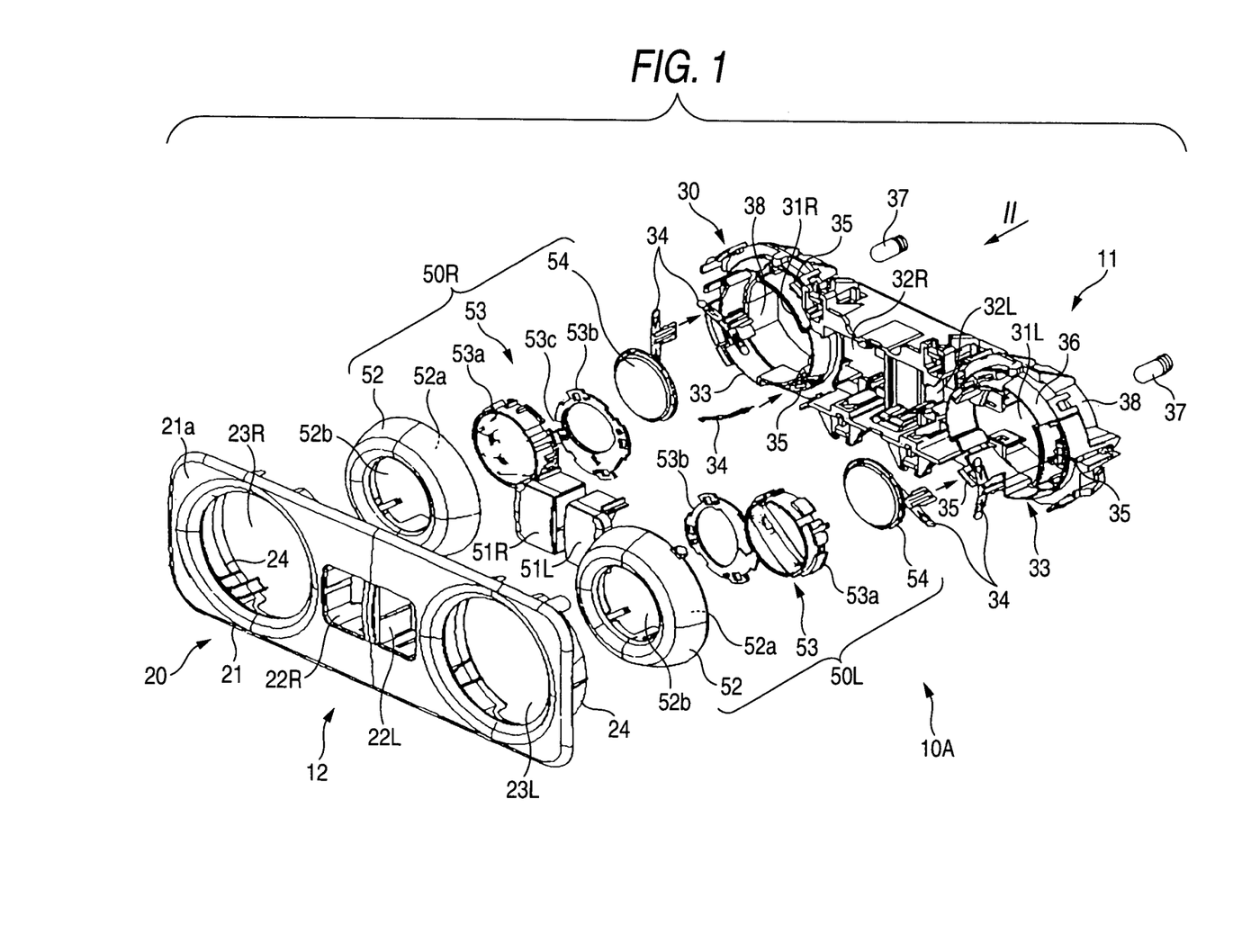
FIG. 1 is an exploded, perspective view showing a preferred embodiment of an interior illumination lamp of the invention.

As shown in FIG. 1, the interior illumination lamp 10 of this embodiment includes a design portion 20 for exposure to a car room (passenger compartment) 12 (see FIG. 4), and a function portion body 30 (serving as a body) which is provided on an inner side of the design portion 20, and has various electrical parts mounted thereon.

Figure 4:
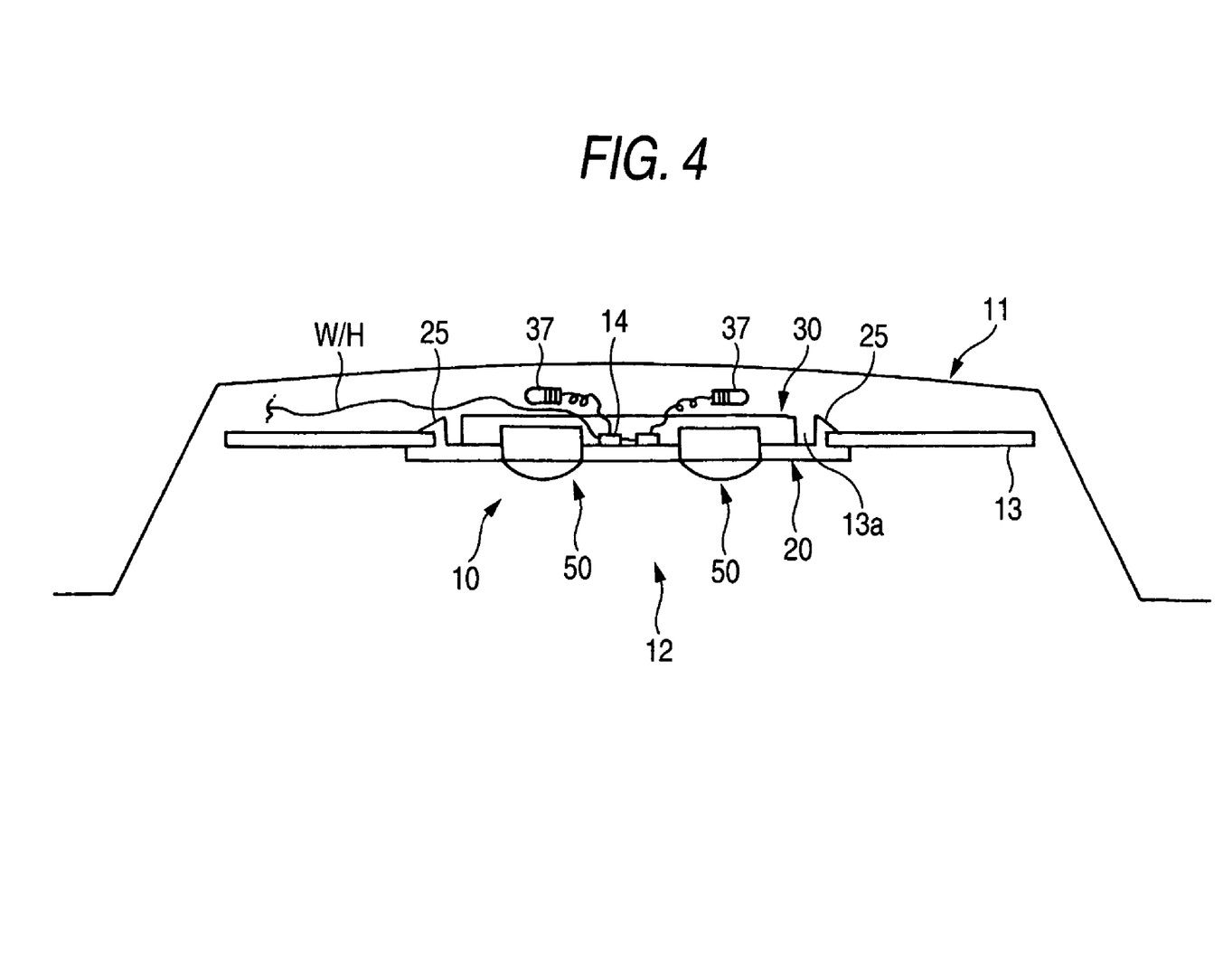
FIG. 4 is a cross-sectional view showing a condition in which the interior illumination lamp of the invention is mounted on a vehicle body.

As shown in FIG. 4, this interior illumination lamp 10 is mounted on the vehicle body 11 by mounting the design portion 20 on an interior member (trim) 13 beforehand mounted on the inside of the vehicle body 11. The interior illumination lamp 10 can be easily connected to a wire harness W/H beforehand installed on a reverse side of the interior member 13.

Figure 2:
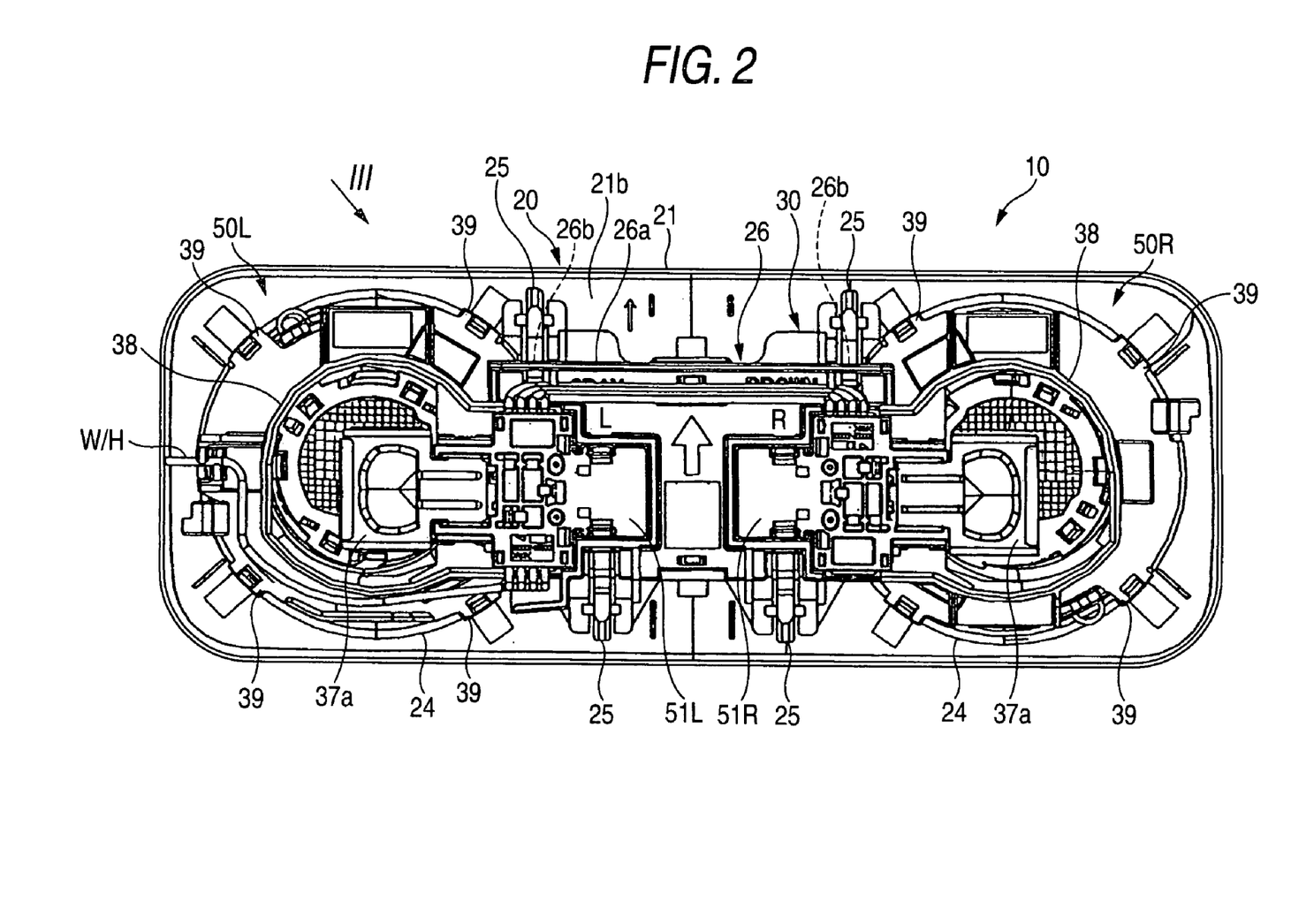
FIG. 2 is a rear view of the interior illumination lamp as seen in a direction II of FIG. 1.
Figure 3:
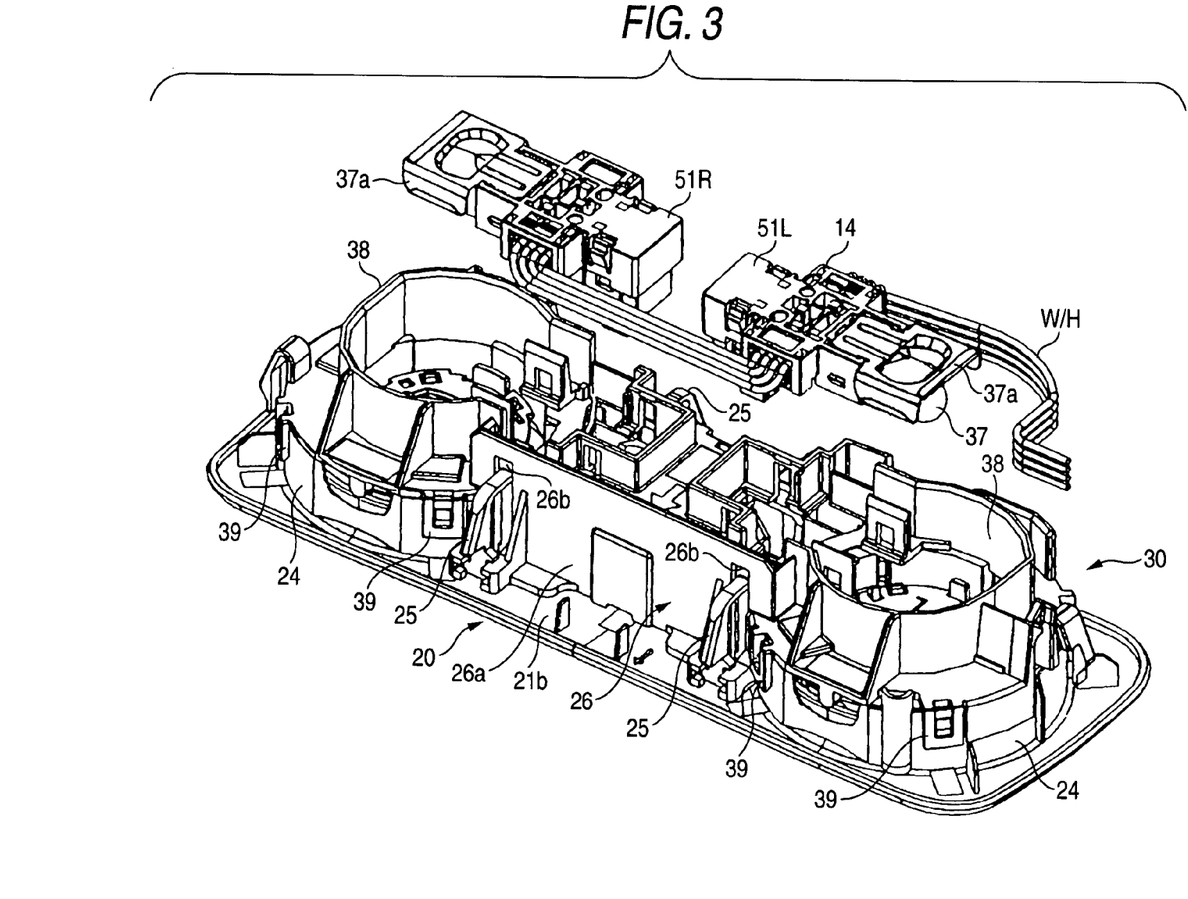
FIG. 3 is a perspective view as seen in a direction III of FIG. 2.

As shown in FIGS. 1 to 3, the design portion 20 includes a housing 21, for example, of a rectangular shape exposed at its surface 21a to the car room 12. Switch holes 22L and 22R are formed through a central portion of the housing 21, and left and right switches 51L and 51R are exposed to the car room 12 respectively through these switch holes 22L and 22R. Also, lamp holes 23L and 23R are formed respectively through left and right portions of the housing 21, and left and right lamps 50L and 50R are exposed to the car room 12 respectively through these lamp holes 23L and 23R. A mounting portion 24 of a generally cylindrical shape is provided at each of the lamp hole portions 23L and 23R, and extends inwardly from a reverse surface 21b of the housing 21, and the function portion body 30 is mounted on the housing 21 through these mounting portions 24. As shown in FIGS. 2 and 3, clips 25 (see FIGS. 2 and 4) for mounting the housing 21 on the interior member 13 at a ceiling portion of the car room 12 are provided on the reverse surface 21b of the housing 21.

As shown in FIGS. 1 to 3, the function portion body 30 is a frame-like member having an elongated ellipse-shape as a whole, and lamp receiving holes 31L and 31R for respectively receiving the lamps 50L and 50R are formed through left and right end portions thereof, respectively. Switch receiving portions 32L and 32R, in which the switches 51L and 51R are mounted, respectively, are provided at a central portion of the function portion body 30 disposed between the two lamp receiving holes 31L and 31R. Connectors 14, mounted at a distal end portion of the wire harness. W/H, are connected to connection terminals of the switches 51L and 51R, and with this construction the switches 51L and 51R can be easily mounted and removed (see FIG. 4).

Ring members 33 of a circular shape, serving as support portions for respectively supporting the lamps 50L ad 50R, are mounted on edges of the two lamp receiving holes 31L and 31R, respectively. A guide member 38 of a generally cylindrical shape is provided at each of the ring members 33, and projects from the reverse side (the right side in FIG. 1) of the function portion body 30. Those portions of the left and right guide members 38, opposed to each other, are notched so that the various electrical parts, including the switches 51L and 51R and bulbs 37 (serving as light sources), can be mounted on the function portion body 30. The guide members 38 are larger in height than all of the electrical parts and others mounted on the function portion body, and function to prevent the electrical parts and others from striking against the vehicle body 11. The bulbs 37 are mounted within the left and right guide members 38, respectively. A reflecting plate 37a is provided at the rear side (the upper side in FIG. 3) of each of the bulbs 37, and can efficiently radiate light, emitted from the bulb 37, in a desired direction.

As shown in FIG. 1, sliding contact member-mounting recesses 35 (each for the mounting of a T-shaped sliding contact member 34 therein) are formed respectively, for example, in three portions of an inner peripheral surface of each ring member 33 equally spaced circumferentially from one another. The sliding contact members 34 are inserted respectively into the sliding contact member-mounting recesses 35 to be mounted therein.

The sliding contact member 34 is a metallic member of a generally T-shape having resiliency, and is normally pressed against a spherical surface 52a by its own resilient force. The resilient member 34 may be made of a resin, and also may have other shape than the generally T-shape.

As shown in FIGS. 1 and 3, guide portions 36 are formed on the outer surface of each of the ring members 33 (provided respectively at the lamp receiving holes 31L and 31R), and project a step therefrom. When the sliding contact members 34 are fittingly mounted respectively in the sliding contact member-mounting recesses 35, an outer surface of each of the guide portions 36 lies between the corresponding adjacent siding contact members 34 in concentric relation thereto, and these guide portions 36 are disposed inwardly of a concentric circle (the spherical surface 52a) on which a sliding contact surface for the sliding contact members 34 is disposed.

A plurality of retaining claws 39 for mounting the function portion body 30 are formed on the outer surface of each ring member 33 at suitable intervals. Therefore, each mounting portion 24 of the design portion 20 is held between the retaining claws 39 and the ring member 33, thereby connecting the function portion body 30 and the housing 21 of the design portion 20 together.

As shown in FIG. 1, the left and right lamps 50L and 50R are mounted between the design portion 20 and the function portion body 30. The left and right lamps 50L and 50R have the same construction, and therefore in the following description, these will be referred to merely as the lamp 50 unless otherwise specified.

FIGS. 5(a) to (c) are cross-sectional views showing a procedure in which a lens 54 is mounted on an inner bezel 53, and then this inner bezel is mounted on an outer bezel 52.

Figure 5:
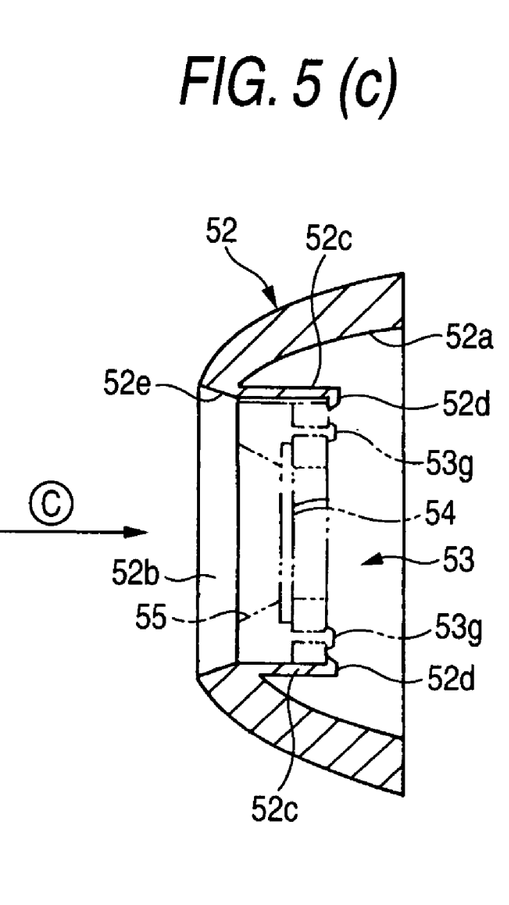
FIGS. 5(a) to (c) are cross-sectional views showing a procedure of mounting an inner bezel on an outer bezel.

As shown in FIGS. 1 and 5, the lamp 50 includes the outer bezel (first bezel) 52, the inner bezel (second bezel) 53, and the lens 54, and this lamp 50 radiates rays of light, emitted from the bulb 37, in a predetermined direction. The lens 54 is so cut as to radiate a beam in a predetermined range.

As shown in FIGS. 1 and 5, the outer bezel 52 has such a size that its distal end portion (left side portion in FIG. 5) projects into the car room 12 through the lamp hole 23L, 23R in the design portion 20. The outer bezel 52 has a partially spherical shape as a whole, and the concave spherical surface 52a is formed on an inner surface thereof. A window 52b in which the lens 54 fits is formed through a central portion of the outer bezel. This window portion 52b is extended inwardly (in a right-hand direction in FIG. 5) to provide a retaining portion 52c (comprising a tubular portion or a plurality of pillar-like portions) having at its distal end retaining claws 52d for retaining the inner bezel 52.

Figure 6:
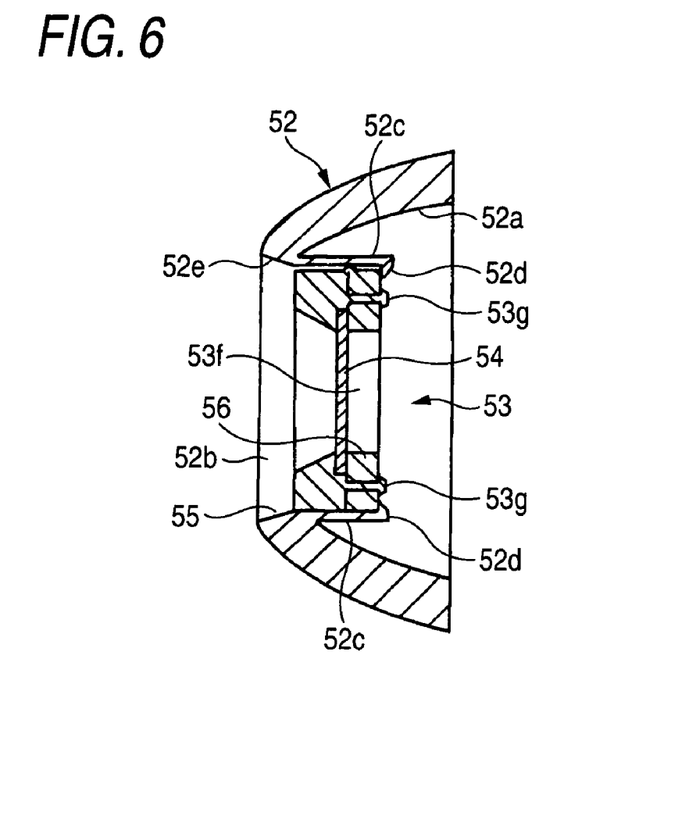
FIG. 6 is a cross-sectional view of the outer bezel having the inner bezel attached thereto.

On the other hand, the inner bezel 53 includes an inner bezel body (second bezel body) 53a of a generally cylindrical shape, and a lid portion 53b mounted on the inner bezel body 53a through a hinge 53c so as to be opened and closed, as shown in FIGS. 5 and 6. A plurality of retaining piece portions 53g are formed on and project from the inner bezel body 53a, and retaining holes 53h, corresponding respectively to the retaining piece portions 53g, are formed in the lid portion 53b (see FIG. 7). Therefore, when the lid portion 53b is closed, the retaining piece portions 53g on the inner bezel body 53a are passed respectively through the retaining holes 53h in the lid portion 53b, and are retained relative thereto, so that the lid portion 53b, while holding the lens 54, is locked to the inner bezel body. A window 53d for the mounting of the lens 54 therein is formed in the inner bezel body 53a, and a window 53f is also formed in the lid portion 53b.

A reflecting surface 55 for reflecting transmitted light through the lens 54 when this transmitted light is incident on this reflecting surface is formed on a front-side inner peripheral surface 53e of the window 53d of the inner bezel 53 at part of the periphery thereof or over the entire periphery thereof, and therefore the reflecting surface 55 is designed to have a low reflectance in order to decrease the intensity of the reflected light. This low-reflectance design can be provided, for example, by shot blast the reflecting surface 55, or by forming the reflecting surface 55 using a material having a black or a grey color, or by applying a coating of a low reflectance to the reflecting surface 55. This reflecting surface should be at least lower in reflectance than the surface of the outer bezel 52.

Figure 7:
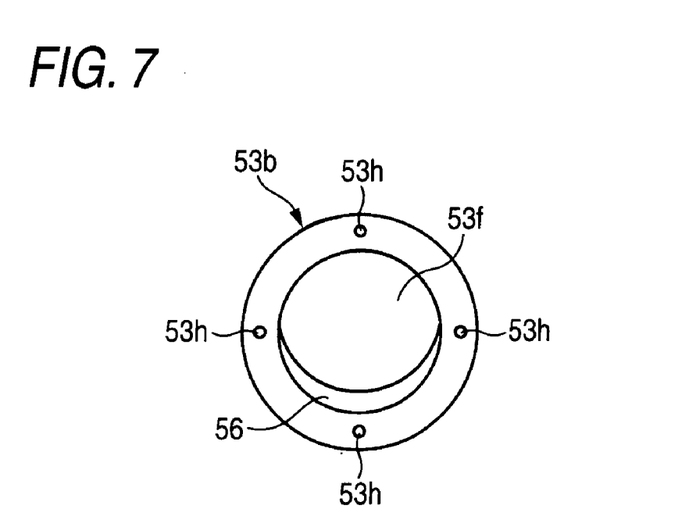
FIG. 7 is a front-elevational view of a lid portion of the inner bezel.

FIG. 6 is a cross-sectional view of the outer bezel 52 having the inner bezel 53 attached thereto, and FIG. 7 is a front-elevational view of the lid portion 53b of the inner bezel 53.

As shown in FIGS. 6 and 7, a light-intercepting portion 56 is provided at the lid portion 53b of the inner bezel 53. This light-intercepting portion 56 intercepts part of a beam from the bulb 37, and prevents the beam from being irradiated to a portion to which the beam is not to be irradiated. Therefore, the light-intercepting portion 56 is formed on an inner peripheral surface of the window 53f in the lid portion 53b, so that the window 53f has a round shape with part thereof removed, as shown in FIG. 7. The light-intercepting portion 56 can be formed integrally with the lid portion 53b, but can be mounted on the lid portion at a later stage.

For forming the lamp 50 by mounting the lens 54 and the inner bezel 53 on the outer bezel 52, first, the lens 54 is fitted into the window 53d in the inner bezel 53 (as indicated by arrow A in FIG. 5(a)), and the lid portion 53b is closed to be retained on the inner bezel (as indicated by arrow B in FIG. 5(b)), thereby uniting the lens 54 and the inner bezel 53. Then, the inner bezel 53, having the lens. 54 attached thereto, is pushed into the window 52b of the outer bezel 52 from the front side of this window 52b (as indicated by arrow C in FIG. 5(c)), with the lens portion 54 held between the inner bezel 53 and the outer bezel 52, and the inner bezel 53 is retained by the retaining claws 52d formed respectively at the distal end of the retaining portion 52c.

The inner bezel 53 is thus engaged in the inside of the outer bezel 52, so that the lens 54 is retained in a double manner.

The left and right lamps 50L and 50R of the above construction are mounted respectively in the lamp receiving holes 31L and 31R in the function portion body 30 in such a manner that each lamp 50L, 50R can be angularly moved (turned), and can also be fixed in a predetermined position. Namely, the three sliding contact members 34, mounted on the function portion body 30, are disposed inside the outer bezel 52, and are resiliently pressed against the spherical surface 52a, so that the outer bezel 52 can be angularly moved relative to the function portion body 30, and can also be fixed in a desired position.

As described above, in the interior illumination lamp 10, the reflecting surface 55 of the inner bezel 53 for reflecting transmitted light through the lens 54 when this transmitted light is incident on this reflecting surface 55 is designed to have a low reflectance, and by doing so, the light, reflected by the reflecting surface 55, is not glaring. Therefore, the beam, coming into the driver's sight via a room mirror, is not glaring, and therefore will not affect the driving operation.

And besides, the light-intercepting portion 56, provided at the lid portion 53b of the inner bezel 53, intercepts part of a beam from the bulb 37, and therefore the beam is prevented from being irradiated to an unnecessary range.

The interior illumination lamp 10 of the invention is not limited to the above embodiment, and suitable modifications, improvements, etc., can be made.

Namely, in the above embodiment, although there are provided the pair of left and right lamps 50L and 50R, the number of the lamps 50 is arbitrary, and maybe one or more than two. Therefore, the number of the lamp holes 23 as well as the number of the switch holes 22 corresponds to the number of the lamps 50, and can vary suitably.

And besides, the material, shape, dimensions, form, number, mounting position, etc., of the sliding contact member, outer bezel, inner bezel, function portion body, design portion housing, etc., of the above embodiment are arbitrary, and are not limited in so far as the invention can be achieved.

What is claimed is:

1. An interior illumination lamp comprising:
a body fixed to a vehicle body;
a lamp rotatably supported on a support portion mounted on said body, said lamp including;
a lens capable of transmitting a beam from a light source therethrough;
a first bezel rotatably supported on said support portion; and
a second bezel, for holding said lens, attached on said first bezel, said second bezel having a reflecting surface for receiving and reflecting transmitted light through said lens, and said reflecting surface designed to have a predetermined low reflectance, wherein said reflecting surface is lower in the reflectance than the surface of said first bezel.

2. An interior illumination lamp according to claim 1, wherein said second bezel includes a second bezel body holding said lens and a lid portion attached to said second bezel portion with said lens held therebetween, and
wherein said first bezel is fixed to said second bezel so as to retain said lens in a double manner.

3. An interior illumination lamp according to claim 2, wherein said lid portion has a light-intercepting portion for intercepting part of a beam which is emitted from said light source to be incident on said lens.

* * * * *